United States Patent [19]

Handke et al.

[11] Patent Number: 4,655,439
[45] Date of Patent: Apr. 7, 1987

[54] SHOCK STRUT FOR A VEHICLE

[75] Inventors: Günther Handke, Euerbach; Ernst Prozeller, Schweinfurt, both of Fed. Rep. of Germany

[73] Assignee: Fichtel & Sachs AG

[21] Appl. No.: 794,759

[22] Filed: Nov. 4, 1985

[30] Foreign Application Priority Data

Nov. 17, 1984 [DE] Fed. Rep. of Germany ....... 3442108

[51] Int. Cl.⁴ ...................... B60G 15/00; B60G 15/06
[52] U.S. Cl. ................. 267/8 R; 188/322.12; 267/60; 267/166; 267/169; 267/170
[58] Field of Search ................ 267/8 R, 60, 61, 62, 267/34, 66-68, 166, 169, 170-179, 51; 280/668, 666, 670, 696, 701, 724; 188/322.12

[56] References Cited

U.S. PATENT DOCUMENTS

| | | | |
|---|---|---|---|
| 3,580,557 | 5/1971 | Dean | 267/34 X |
| 3,603,610 | 9/1971 | Thompson | 267/60 X |
| 4,462,608 | 7/1984 | Lederman | 267/8 R X |
| 4,474,363 | 10/1984 | Numazawa et al. | 267/8 R X |
| 4,482,135 | 11/1984 | Ishida et al. | 267/8 R |

FOREIGN PATENT DOCUMENTS

| | | |
|---|---|---|
| 1430586 | 3/1969 | Fed. Rep. of Germany . |
| 2656707 | 6/1978 | Fed. Rep. of Germany ...... 280/668 |
| 3423557 | 1/1986 | Fed. Rep. of Germany ..... 267/8 R |

*Primary Examiner*—Douglas C. Butler
*Attorney, Agent, or Firm*—Toren, McGeady and Goldberg

[57] ABSTRACT

In a shock strut for a vehicle including a spring plate for supporting a helical spring, a receiving or catching member is connected to the spring plate. The receiving member prevents any lateral movement of the helical spring in the event of a spring failure. A simple connection of the receiving member to the spring plate is provided independently of the materials used for these members. The connection is afforded by downwardly projecting parts on the receiving member which extend through suitably dimensioned openings in the spring plate.

12 Claims, 5 Drawing Figures

SHOCK STRUT FOR A VEHICLE

BACKGROUND OF THE INVENTION

The present invention is directed to a shock strut for a vehicle and includes a spring plate for supporting a helical spring with a receiving or holding member connected to the spring plate for preventing the lateral movement of the helical spring in the event of a spring failure.

To counteract the bending moment resulting from the wheel load in a vehicle, the axis of the helical spring in such a shock strut is often arranged eccentrically or obliquely to the axis of the vibration damper, as is the case in the German Auslegeschrift No. 1 430 586. Where a spring plate is attached eccentrically about the container of a vibration damper, a lateral force acts upon the spring which tends to cause lateral displacement of the spring. To maintain the bending moment acting on the piston rod as low as possible, the shock strut is located as closely as possible from the wheel. To prevent any lateral displacement of the spring in the event of a spring failure, a receiving or catching device is proposed in the German patent application P No. 34 23 557.4 published as DT No. 3423557 on Jan. 9, 1986 which holds the helical spring along its outer contour. For a radially fixed attachment of the receiving device with the spring plate a welding connection is used and such a connection is particularly expensive to produce when zinc-coated spring plates are used, since the spot to be welded must be free of any zinc coating.

SUMMARY OF THE INVENTION

Therefore, it is the primary object of the present invention to provide a simple and economical connection of the receiving device to the spring plate.

In accordance with the present invention, the receiving device is provided with downwardly extending projecting parts which extend through correspondingly dimensioned openings in the spring plate for interconnecting the receiving device and the spring plate. As a result, a radially fixed connection between the receiving device and the spring plate is afforded where the connection is maintained very small and little effort is required for making the connection, since the receiving device is anchored to the spring plate by the projecting parts. Further, another feature of the invention is the arrangement of the projecting parts and the openings along an arcuately shaped line extending in the circumferential direction with the radius of the line adapted to the radius of the receiving device.

To obtain a satisfactory axial locking of the receiving device on the spring plate, in accordance with the present invention, the projecting parts are bent over after the receiving device is placed on the spring plate. In a particularly advantageous embodiment, two projecting parts are provided through each opening in the spring plate and the pair of projecting parts are bent in opposite directions relative to one another. As a result, an excellent clamping of the receiving device to the spring plate is achieved, since any spring back of the projecting parts is avoided whereby no noise can be generated by the connection. In a particularly simple and functional connection, the receiving device is provided with a contact surface for the spiral spring with the contact surface configured so that it has a shape corresponding to the spring plate. In such an arrangement the receiving device is fixed in the axial direction due to the pretensioned helical spring holding the receiving device against the spring plate, and, at the same time, any displacement in the radial direction is prevented due to the projecting parts extending through the openings in the spring plate.

In another preferred arrangement of the present invention, the engagement between the receiving device and the spring plate is afforded by a snap-on connection. The snap-on connection is effected by suitably stamped lugs on the projecting parts which interengage with the spring plate after the projecting parts are placed through the openings in the spring plate.

The receiving device can be formed of different materials. In accordance with the present invention, the receiving device can be produced as a metal reinforced plastics material part. The use of a variety of materials is possible due to the connection afforded by the present invention between the receiving device and the spring plate. The receiving device along with the spring plate can be given a corrosion protective coating without any production difficulties occurring when the two members are subsequently connected together.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
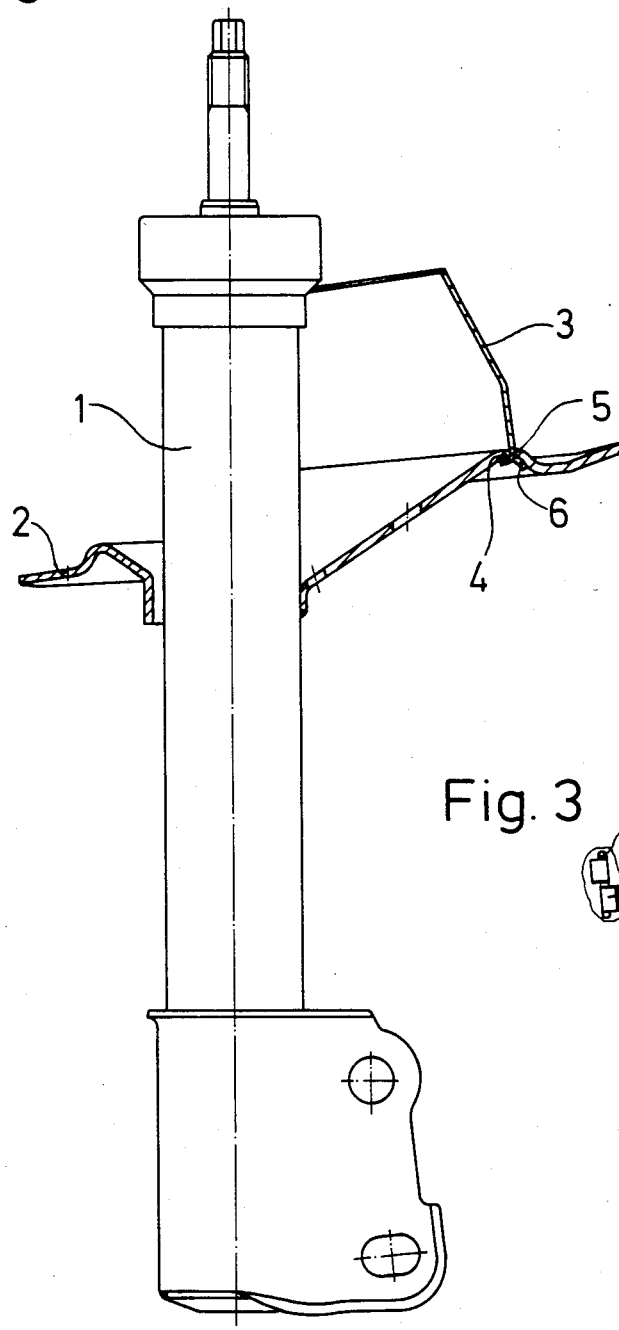
FIG. 1 is an elevational view of a shock strut supporting a spring plate.
Figure 3:
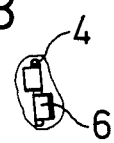
FIG. 3 is a partial view of the connection between the receiving device and the spring plate.
Figure 2:
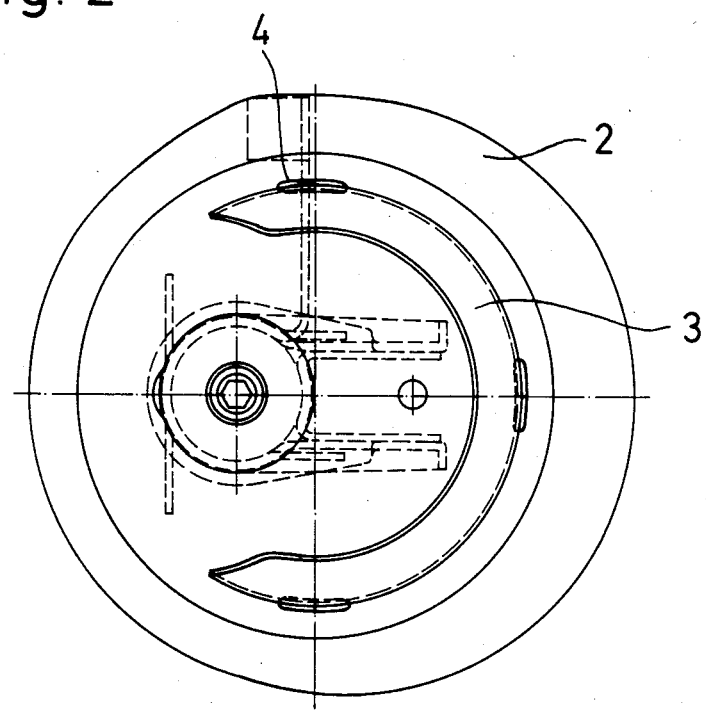
FIG. 2 is a plan view of the arrangement shown in FIG. 1.

In the embodiment illustrated in FIGS. 1–3 a shock strut for a vehicle is shown including a vibration damper formed by an upwardly arranged axial extending generally cylindrically shaped container 1. The lower end of the container is rigidly connected with a wheel carrier and a piston rod extends upwardly out of the upper end of the container and is supported in the vehicle body, not shown. A receiving device 3 is positioned in an inner space formed by a vehicle support spring, not shown. The vehicle support spring is a helical spring supported at its lower end on the spring plate 2 with the receiving device 3 extending upwardly in the axial direction of the helical spring.

As can be seen in FIG. 2, the receiving device or member extends angularly about the container 1 and has a U-shaped appearance in plan view.

To connect the receiving device 3 to the spring plate 2, openings or recesses 4 are formed in the spring plate and projecting parts 5 are formed on the lower end of the receiving device so that they extend through the openings 4. Due to the downwardly extending projecting parts 5, the receiving device 3 is held in the radial direction on the spring plate 2 and is fixed in the axial direction by bending the projecting parts extending through the spring plate into contact with the lower surface of the plate. Accordingly, the bent over ends 6 of the projecting parts 5 bear against the lower surface of the spring plate 2.

As displayed particularly in FIG. 3, each opening 4 through the spring plate 2 is penetrated by a pair of downwardly extending projecting parts with the bent over ends 6 of each pair being directed in opposite directions relative to one another. As can be seen in FIG. 3, one bent over part is bent radially inwardly and the other is bent radially outwardly.

Figure 4:
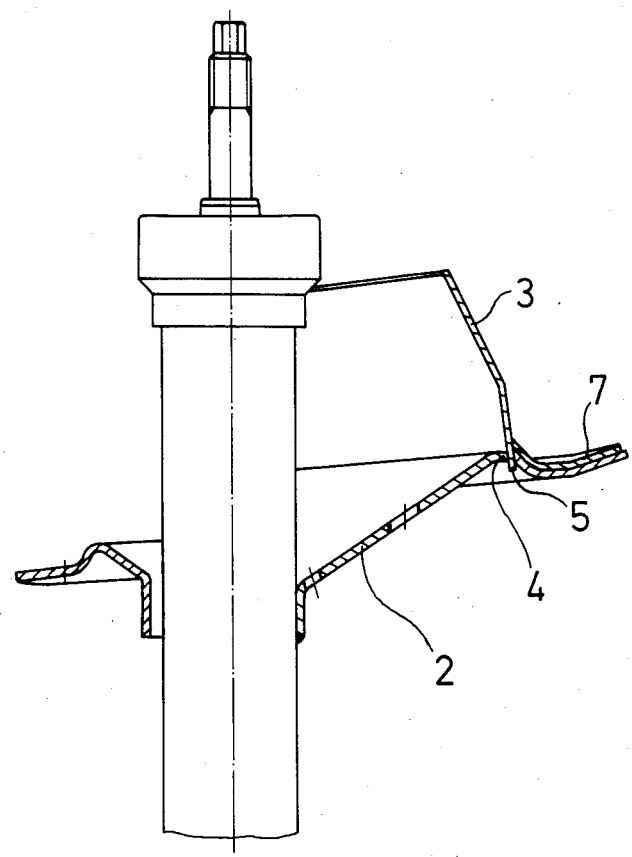
FIG. 4 is another embodiment of the connection between a receiving device and a spring plate.

Another embodiment is shown in FIG. 4 which differs from the embodiment of FIGS. 1 to 3 in that, in addition to the downwardly extending projecting parts 5, the receiving device 3 has a radial outwardly extending contact part 7 for the helical spring. The contact part 7 is configured so that it has a shape corresponding to the surface of the spring plate 2 against which it bears. Accordingly, the helical spring, not illustrated, presses the contact part 7 against the spring plate 2 and affords a locking action in the axial direction. The radial locking action of the receiving device 3 with the spring plate 2 is effected by the projecting parts 5 extending downwardly through the openings 4 in the spring plate.

Figure 5:
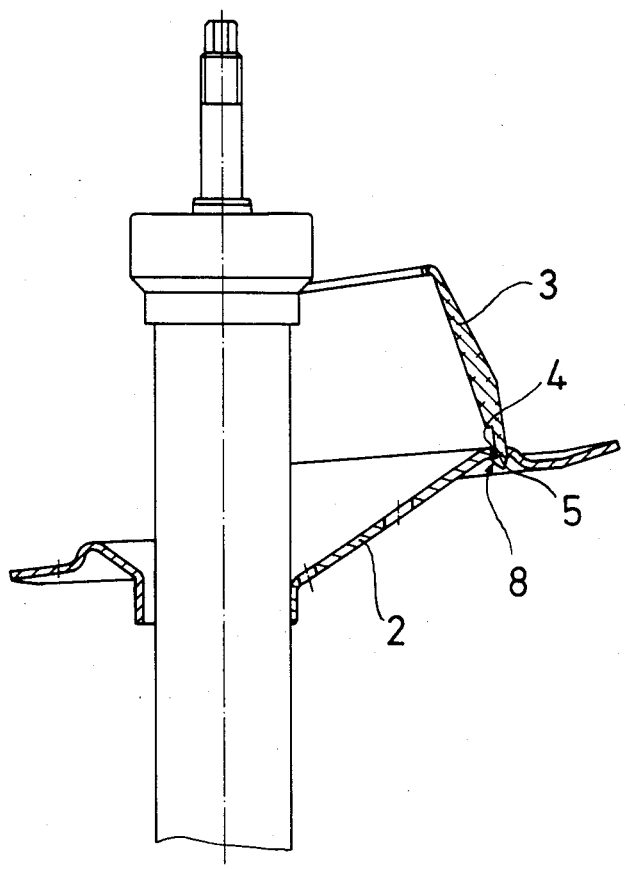
FIG. 5 is still another embodiment of a connection between a receiving device formed of a plastics material and a spring plate.

In FIG. 5 another embodiment of the receiving device 3 formed as a plastics material member is displayed with the projecting parts 5 extending downwardly through the spring plate 2 through the recesses 4 in the plate for effecting the connection between the two members. The lower ends of the projecting parts 5 are provided with retainer lugs 8 which project radially inwardly. Since the projecting parts 5 are formed of a plastics material, when the projecting parts are pressed through the openings 4 in the spring plate 2, the retainer lugs 8 effect a snap-in connection between the receiving device 3 and the spring plate 2.

The different embodiments for the connection of the receiving device 3 to the spring plate 2 afford a considerable choice in the materials to be used and also in the machining of these materials prior to assembly. The receiving device 3 can be formed of metal, plastics material or metal reinforced plastics material.

While specific embodiments of the invention have been illustrated and described in detail to illustrate the application of the inventive principles, it will be understood that the invention may be embodied otherwise without departing from such principles.

We claim:

1. A shock strut for a vehicle having a vibration damper and a vehicle support spring, the vibration damper includes an upwardly arranged axially extending generally cylindrically shaped container having an upper and lower end, the lower end of said container arranged to be connected to a wheel carrier, the upper end of said container arranged to have a piston rod extending upwardly therefrom out of the container for connection to the vehicle body, the vehicle support spring is a helical spring, a spring plate extending transversely of the axis of said container and rigidly attached to the container, intermediate the upper and lower ends thereof, said spring plate having an upper surface facing toward the upper end of said container and a lower surface facing toward the lower end of said container, a receiving member for said helical spring for preventing the lateral movement of the helical spring in the event of a spring failure is connected to said spring plate, wherein the improvement comprises that said receiving member extends generally in the axial direction of the container and has a lower end with downwardly directed projecting parts with the lower end of said receiving member bearing downwardly on the upper surface of said spring plate, said spring plate having recesses extending downwardly from the upper surface thereof and shaped so that said projecting parts extend into the recesses for securing said receiving member to said spring plate.

2. A shock strut, as set forth in claim 1, wherein said receiving member extending arcuately relative to the axis of said container, said projecting parts and said recesses are located along an arcuately shaped line extending in the circumferential direction around said container and said arcuately shaped line being adapted to the radius of said receiving member.

3. A shock strut, as set forth in claim 2, wherein said recesses are openings extending through said spring plate in the axial direction of said container from the upper surface to the lower surface of said spring plate.

4. A shock strut, as set forth in claim 3, wherein said projecting parts extending through said openings in said spring plate are bent over into contact with the lower surface of said spring plate.

5. A shock strut, as set forth in claim 4 wherein a pair of said projecting parts extend through each said opening in said spring plate and said projecting parts of said pair are bent in opposite directions relative to one another.

6. A shock strut, as set forth in claim 3, wherein said projecting parts have a snap-on connection at the ends thereof arranged to project through the openings in said spring plate for effecting a locking interengagement with the lower surface of said spring plate.

7. A shock strut, as set forth in claim 1, wherein said receiving member has a radially inner and a radially outer surface, a contact part extending radially outwardly from the radially outer surface of said receiving device adjacent the lower end thereof, said contact part extending transversely of the axis of said container, said contact part having an upper surface facing toward the upper end of said container and a lower end facing toward the lower end of said container with the upper surface thereof forming a support surface for the helical spring so that the helical spring presses said contact part against said spring plate.

8. A shock strut, as set forth in claim 1, including means for clamping said receiving member to said spring plate.

9. A shock strut, as set forth in claim 8, wherein said receiving member is formed of a metal reinforced plastics material.

10. A shock strut, as set forth in claim 1, wherein said receiving member is formed of a metal reinforced plastics material.

11. A shock strut, as set forth in claim 1, wherein said receiving member is located radially inwardly of said helical spring.

12. A shock strut, as set forth in claim 1, wherein said receiving member extends upwardly from said spring plate to the region of the upper end of said container.

* * * * *